US012652719B2

(12) United States Patent     (10) Patent No.:   US 12,652,719 B2

Bulakci et al.     (45) Date of Patent:     Jun. 9, 2026

(54) CONNECTED STATE UE CONTEXT HANDLING IN SERVICE-BASED (RADIO) ACCESS NETWORK

(71) Applicant: Nokia Solutions and Networks Oy, Espoo (FI)

(72) Inventors: Ömer Bulakci, Munich (DE); Subramanya Chandrashekar, Bangalore (IN); Ece Ozturk, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 318 days.

(21) Appl. No.: 18/568,351

(22) PCT Filed: Jul. 13, 2022

(86) PCT No.: PCT/EP2022/069559

§ 371 (c)(1),
(2) Date: Dec. 8, 2023

(87) PCT Pub. No.: WO2023/001652

PCT Pub. Date: Jan. 26, 2023

(65) Prior Publication Data

US 2024/0284541 A1     Aug. 22, 2024

(30) Foreign Application Priority Data

Jul. 19, 2021    (IN) .............................. 202141032360

(51) Int. Cl.
   *H04W 4/00*       (2018.01)
   *H04W 36/00*      (2009.01)
           (Continued)

(52) U.S. Cl.
   CPC ....... *H04W 76/20* (2018.02); *H04W 36/0033* (2013.01); *H04W 36/08* (2013.01); *H04W 36/36* (2013.01); *H04W 60/04* (2013.01)

(58) Field of Classification Search
   CPC . H04W 76/20; H04W 36/0033; H04W 36/08; H04W 36/36; H04W 60/04
   See application file for complete search history.

(56) References Cited

U.S. PATENT DOCUMENTS 10,485,051 B2   11/2019   Mildh et al.
10,820,192 B2 *   10/2020   Gage ................... H04W 12/041
               (Continued)

FOREIGN PATENT DOCUMENTS

EP      3753298 A1    12/2020
EP      3927106 A1    12/2021
               (Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

(Continued)

*Primary Examiner* — Abdelnabi O Musa

(74) *Attorney, Agent, or Firm* — Nokia Technologies Oy

(57) ABSTRACT

In some example embodiments, there may be provided a method comprising: receiving, from a first network node in a network via a service-based interface, an update request comprising at least one context information for at least one user equipment in the network and a context key, wherein the at least one user equipment is in a radio resource control connected state; storing or updating the at least one context information at the radio access network data storage function; receiving a retrieve request from a second network (Continued)

node in the network, wherein the retrieve request comprises the context key; retrieving the at least one context information for the at least one user equipment in response to the retrieve request from the second network node based at least on the context key; and sending the at least one context information to the second network node. Related systems, methods, and articles of manufacture are also disclosed.

20 Claims, 8 Drawing Sheets

(51) Int. Cl.
| | |
|---|---|
| *H04W 36/08* | (2009.01) |
| *H04W 36/36* | (2009.01) |
| *H04W 60/04* | (2009.01) |
| *H04W 76/20* | (2018.01) |

(56) References Cited

U.S. PATENT DOCUMENTS

| | | | | |
|---|---|---|---|---|
| 11,369,000 | B2 * | 6/2022 | Geng | H04W 68/005 |
| 11,533,667 | B2 * | 12/2022 | Shah | H04W 36/324 |
| 2019/0261260 | A1 * | 8/2019 | Dao | H04W 8/20 |
| 2020/0029297 | A1 | 1/2020 | Baek et al. | |
| 2020/0037210 | A1 | 1/2020 | Rugeland et al. | |
| 2020/0120474 | A1 | 4/2020 | Chandramouli et al. | |
| 2020/0229069 | A1 | 7/2020 | Chun | |
| 2020/0267539 | A1 | 8/2020 | Tamura et al. | |
| 2020/0367045 | A1 | 11/2020 | Jeong et al. | |
| 2021/0212152 | A1 | 7/2021 | Gage et al. | |
| 2022/0312533 | A1 * | 9/2022 | Drevö | H04W 12/06 |
| 2022/0369176 | A1 * | 11/2022 | Bressanelli | H04W 36/0038 |

FOREIGN PATENT DOCUMENTS

| | | | | | |
|---|---|---|---|---|---|
| WO | 2020/178622 | A1 | 9/2020 | | |
| WO | 2020/200118 | A1 | 10/2020 | | |
| WO | WO-2021001680 | A1 * | 1/2021 | | H04W 76/27 |
| WO | 2022/128125 | A1 | 6/2022 | | |

OTHER PUBLICATIONS

"3rd Generation Partnership Project; Technical Specification Group Radio Access Network; NG-RAN; Architecture description (Release 16)", 3GPP TS 38.401, V16.5.0, Apr. 2021, pp. 1-79.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Services and System Aspects; Management and orchestration; Architecture framework (Release 16)", 3GPP TS 28.533, V16.7.0, Mar. 2021, pp. 1-30.

"New Study on Service-based N2", 3GPP TSG SA2 Meeting #145E (e-meeting), S2-2104226, Agenda Item: 9.1.4, Intel, May 17-28, 2021, 4 pages.

"Msc-generator", Sourceforge, Retrieved on Jan. 3, 2024, Webpage available at : https://sourceforge.net/projects/msc-generator/.

"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.

Da Silva et al., "A novel state model for 5G radio access networks", International Conference on Intelligent Cloud Computing, May 23, 2016, 6 pages.

"System architecture milestone of 5G Phase 1 is achieved", 3GPP, Retrieved on Dec. 11, 2023, Webpage available at : https://www. 3gpp.org/news-events/3gpp-news/sys-architecture.

"3rd Generation Partnership Project; Technical Specification Group Core Network and Terminals; 5G System; Network Function Repository Services; Stage 3 (Release 17)", 3GPP TS 29.510, V17.2.0, Jun. 2021, pp. 1-256.

IEEE 802.11, Wikipedia, Retrieved on Jan. 3, 2024, Webpage available at : https://en.wikipedia.org/wiki/IEEE_802.11.

IEEE 802.16, Wikipedia, Retrieved on Jan. 5, 2024, Webpage available at : https://en.wikipedia.org/wiki/IEEE 802.16.

IEEE 802.3, Wikipedia, Retrieved on Jan. 5, 2024, Webpage available at : https://en.wikipedia.org/wiki/IEEE 802.3.

IEEE 802.15, Wikipedia, Retrieved on Jan. 5, 2024, Webpage available at : https://en.wikipedia.org/wiki/IEEE 802.15.

International Search Report and Written Opinion received for corresponding Patent Cooperation Treaty Application No. PCT/EP2021/070096, dated Apr. 4, 2022, 16 pages.

"Open Issues of Solution 18", 3GPP TSG-RAN WG2 #NB-IOT, R2-160460, Agenda Item: 5.1.2, CATT, Jan. 19-21, 2016, pp. 1-4.

"Mega CR to clean up", 3GPP TSG-SA2 Meeting #142E, S2-2009068, Nokia, Nov. 16-20, 2020, pp. 1-427.

Commenting contribution on Ericsson's S3-160157 "Security for RRC Connection Suspend and Resume procedure in solution 18 for Narrow Band CIoT", 3GPP TSG-SA WG3 Meeting #82, S3-160225, Agenda Item: 7.15, Alcatel-Lucent, Feb. 1-5, 2016, 8 pages.

"Signaling details for UP based solution", 3GPP TSG-RAN WG3 Meeting NB-IOT, R3-160057, Agenda item: 26.2, Jan. 20-22, 2016, 5 pages.

International Search Report and Written Opinion received for corresponding Patent Cooperation Treaty Application No. PCT/EP2022/069736, dated Nov. 7, 2022, 15 pages.

"3rd Generation Partnership Project; Technical Specification Group Services and System Aspects; System architecture for the 5G System (5GS); Stage 2 (Release 17)", 3GPP TS 23.501, V17.1.1, Jun. 2021, pp. 1-526.

International Search Report and Written Opinion received for corresponding Patent Cooperation Treaty Application No. PCT/EP2022/069559, dated Nov. 17, 2022, 17 pages.

"Update on solutions of TR 23.973", SA WG2 Meeting #132, S2-1904082, Agenda Item: 6.29, China Mobile, Apr. 8-12, 2019, pp. 1-60.

* cited by examiner

CONNECTED STATE UE CONTEXT HANDLING IN SERVICE-BASED (RADIO) ACCESS NETWORK

RELATED APPLICATION

This application was originally filed as PCT Application No. PCT/EP2022/069559, filed on Jul. 13, 2022, which claims priority from IN application No. 202141032360, filed on Jul. 19, 2021, each of which is incorporated herein by reference in its entirety.

FIELD

The subject matter described herein relates to wireless communications.

BACKGROUND

Mobile and wireless communications networks are increasingly being deployed in cloud-based platforms. Furthermore, the cellular system, such as 5G and the new generations beyond (e.g., 6G, 7G, and the like) may seek to be flexible by adding new functionalities into the cellular system to capitalize on the cloud-based platforms. For example, cloud-based platforms may enable the use of virtualized functions that are physically hosted at a cloud service provider to enable flexible and scalable deployments of such functions.

SUMMARY

In some example embodiments, there may be provided a method comprising: receiving at a radio access network data storage function in a network, from a first network node in the network via a service-based interface, an update request comprising at least one context information for at least one user equipment in the network and a context key, wherein the at least one user equipment is in a radio resource control connected state; storing or updating the at least one context information for the at least one user equipment at the radio access network data storage function; receiving a retrieve request from a second network node in the network via the service-based interface, wherein the retrieve request comprises the context key; retrieving the at least one context information for the at least one user equipment in response to the retrieve request from the second network node based at least on the context key; and sending the at least one context information for the at least one user equipment to the second network node via a service-based interface.

In some variations, one or more of the features disclosed herein including the following features can optionally be included in any feasible combination. The first network node is the same as the second network node. The first network node and/or the second network node comprises or is comprised in a base station in the network, a centralized unit of the base station, a distributed unit of the base station, a near-real-time radio access network intelligence controller in the network, and/or a network function in the network. The update request comprises an indication indicating a radio resource control state of the at least one user equipment. The method may further include prioritizing the retrieval of the at least one context information for the at least one user equipment based at least on the radio resource control state of the at least one user equipment. The context key is associated with the at least one context information for the at least one user equipment in the radio resource control connected state to enable storage and/or retrieval of the at least one context information at the radio access network data storage function. The context key comprises at least an access point identifier allocated by a third network node in the network, wherein the third network node comprises or is comprised in a base station in the network, a centralized unit of the base station, a distributed unit of the base station in the network, a near-real-time radio access network intelligence controller in the network, a access and mobility management function in the network or a network function in the network. The context key is allocated by the third network node when the at least one user equipment performs an initial access to the network to move into the radio resource control connected state. The third network node comprises the first network node or the second network node. The method may further include receiving a register request and/or a subscribe request from a fourth network node in the network. The method may further include notifying, by the radio access network data storage function, the fourth network node of an update of the at least one context information for the at least one user equipment, wherein the fourth network node is registered and/or subscribed to the radio access network data storage function.

In some example embodiments, there may be provided a method comprising: sending, by a first network node in a network via a service-based interface, to a radio access network data storage function in the network, an update request comprising at least one context information for at least one user equipment in the network and a context key, wherein the at least one user equipment is in a radio resource control connected state; sending, by the first network node via the service-based interface, a retrieve request to the radio access network data storage function to retrieve the at least one context information for the at least one user equipment, wherein the retrieve request message comprises the context key; and receiving, by the first network node, the at least one context information for the at least one user equipment from the radio access network data storage function via the service-based interface.

In some variations, one or more of the features disclosed herein including the following features can optionally be included in any feasible combination. The update request comprises an indication indicating a radio resource control state of the at least one user equipment. The method may further include sending a handover request to a second network node in the network, wherein the handover request comprises an user equipment identifier of the at least one user equipment, and wherein the handover request comprises no context information for the at least one user equipment. The method may further include sending the retrieve request to the radio access network data storage function in response to a handover request, wherein the handover request comprises an user equipment identifier of the at least one user equipment, and wherein the handover request comprises no context information for the at least one user equipment. The method may further include sending the retrieve request to the radio access network data storage function in response to a handover request, wherein the handover request comprises an user equipment identifier of the at least one user equipment and the at least one context information for the at least one user equipment. The context key comprises the user equipment identifier of the at least one user equipment. The method may further include sending a register request and/or a subscribe request to the radio access network data storage function, wherein the register request and/or the subscribe request comprises an identifier of the first network node. The method may further include receiving an update of the at least one context information for the at least one user equipment from the radio access network data storage function after being registered and/or subscribed to the radio access network data storage function. The context key is associated with the at least one context information for the at least one user equipment in the radio resource control connected state to enable storage and/or retrieval of the at least one context information at the radio access network data storage function. The context key comprises at least an access point identifier allocated by a third network node in the network, wherein the third network node comprises or is comprised in a base station in the network, a centralized unit of the base station, a distributed unit of the base station, a near-real-time radio access network intelligence controller in the network, a access and mobility management function in the network or a network function in the network. The context key is allocated by the third network node when the at least one user equipment performs an initial access to the network to move into the radio resource control connected state. The third network node comprises the first network node or the second network node.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
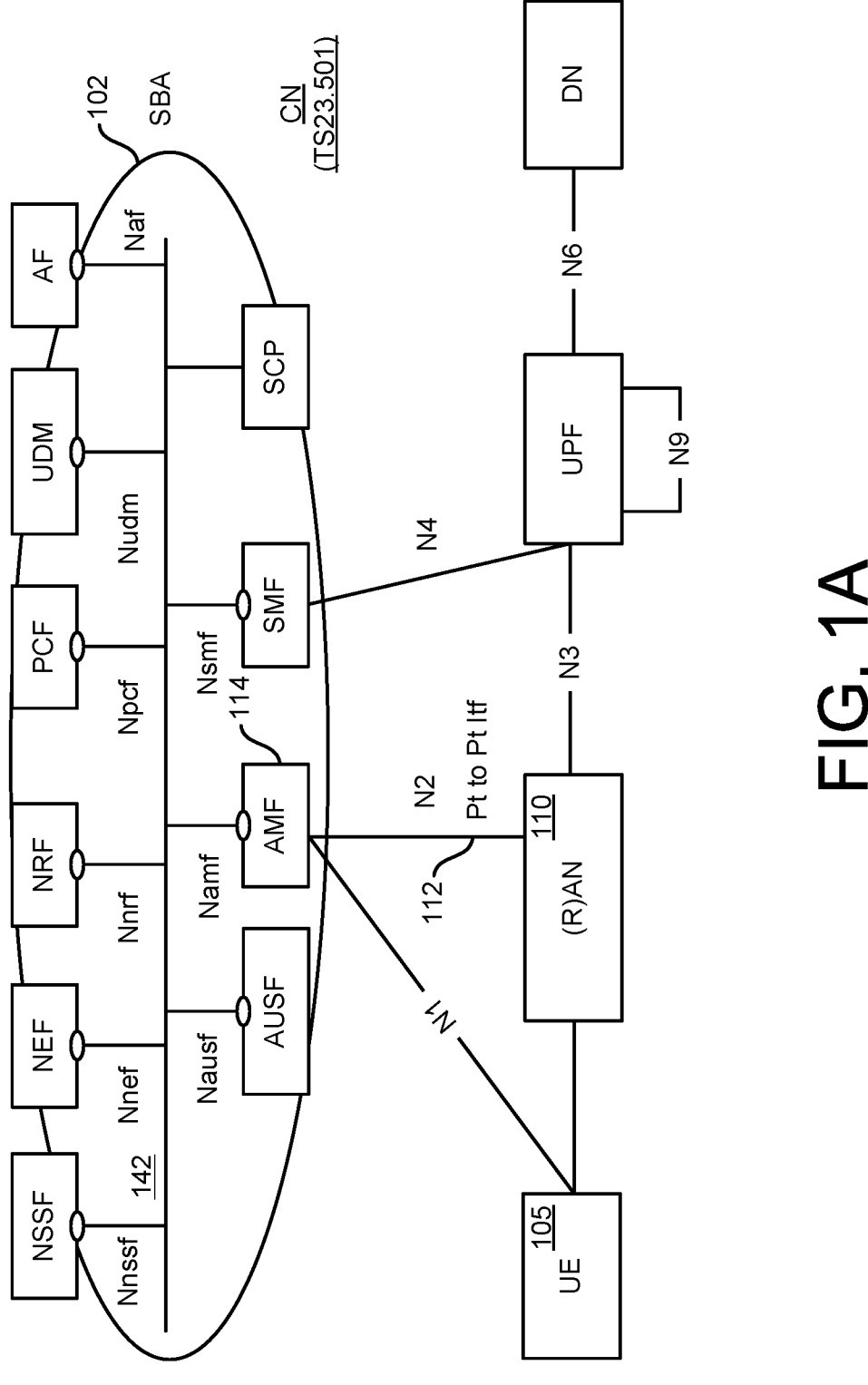
FIG. 1A depicts a core network including interfaces to other functions and nodes in the radio access network, in accordance with some example embodiments.

Like labels are used to refer to same or similar items in the drawings.

DETAILED DESCRIPTION

Figure 1B:
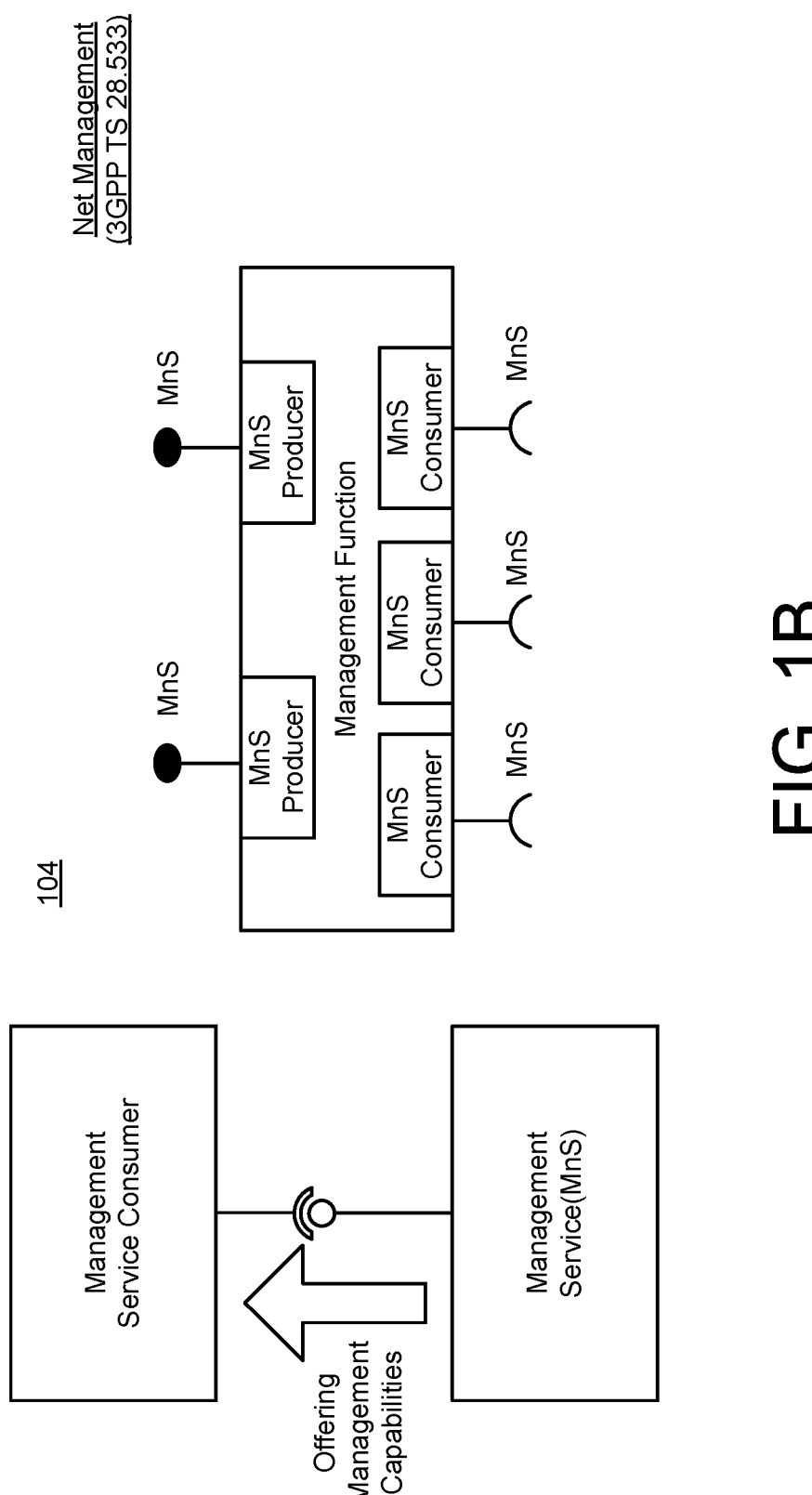
FIG. 1B depicts a service-based management architecture (SBMA) for a cellular system management, in accordance with some example embodiments.

FIG. 1 depicts a core network 102, such as the 5G core, wherein one or more (if not all) of the functions in the 5G core are defined within a service-based (SB) architecture (SBA) which can be implemented in a cloud-based platform and utilizes service-based interfaces (SBI) for exposing and accessing the defined and/or implemented services (see, e.g., 3GPP TS 23.501). FIG. 1 also shows the network management 104 also employing service-based architecture principles, such as a service-based management architecture (SBMA) (see, e.g., 3GPP TS 28.533). For example, core network functions, such as the network slice selection function (NSSF), network exposure function (NEF), policy control function (PCF), and the like. These network functions (NFs) may be self-contained, independent, and reusable. For example, a network function may provide a service, such as a service provider as well as consume services, such as a service consumer. And, the network function may expose its services through a Service Based Interface (SBI) that employs a well-defined interface application programming interface (API), such as a REST API using a cloud-friendly transfer protocol, such as HTTP(S) (also referred to as an SBI messaging bus 142). In the 5G core SBA for example, a consumer inquires at a network repository function (NRF) in order to discover an appropriate service producer instance. In the 5G core for example, in order to discover and select the appropriate service instances, multiple filtering criteria may be applied by NRF (see, e.g., 3GPP TS 29.510). The network function (NF) service is one type of capability exposed by an NF (e.g., a NF service producer) to other authorized NFs (NF service consumers) through a service-based interface (SBI) as described in for example 3GPP TS 23.501. The NF may expose one or more NF services. NF services may communicate directly between NF Service Consumers and NF Service Producers, or indirectly via a Service Communication Proxy (SCP). However, the access network (AN), such as a radio access network (RAN) 110, and the associated interfaces within the access network, among radio access networks, and between the access network and the core network (CN) may continue to be defined in terms of legacy point-to-point (P2P) interfaces, rather than in accordance with a service-based architecture.

In the example of FIG. 1, the N3 interface (which is between the RAN 110 and the core network node UPF (user plane function)) is depicted as a point-to-point interface along with other point-to-point interfaces N2, N4, N6, and N9 interfaces. In the 5G System (5GS) for example, the N2 interface 112 is a 3GPP NG-C Application Protocol over stream control transmission protocol (SCTP), and is between RAN 110 (e.g., a gNB) and an Access and Mobility management Function (AMF) 114 in the core network 102. Within the access network, there are other point-to-point (P2P) interfaces, such as the Xn interface between two base stations (e.g., gNBs), the F1 interface between a central unit (CU) and a distributed unit (DU) in case of a disaggregated base station (gNB), and the E1 interface between the Centralized Unit Control Plane (CU-CP) and the Centralized Unit User Plane (CU-UP) (see, e.g., 3GPP TS 38.401 for a description of the disaggregated gNB including the CU-CP, CU-CP, DU, and the like).

An access network (AN) can be defined as a network that offers access (such as radio access) that enables to connect subscribers to one or more core networks. The access network may provide 3GPP access such as GSM/EDGE, UTRA, E-UTRA, NR (or 5G) radio access or beyond 5G radio access, or non-3GPP access such as WLAN/Wi-Fi). The access network is contrasted with the core network, which is an architectural term relating to the part of the network (e.g. 3GPP network) which is independent of the connection technology of the terminal (e.g. radio, wired) and which provides core network services such as subscriber authentication, user registration, connectivity to Packet Data Networks, subscription management, etc. An access network and a core network may correspond respectively to, for example, a 3GPP access network and 3GPP core network as defined in 3GPP TS 23.501 and TS 38.401. The access network may include the RAN (radio access network).

The application of service-based architecture (SBA) principles to the access network (e.g., the RAN) may also signal a need for substantial updates to the cellular system including mobile and wireless communication networks and, as such, various aspects may be considered to be realized in the next generations beyond 5G.

Figure 2:
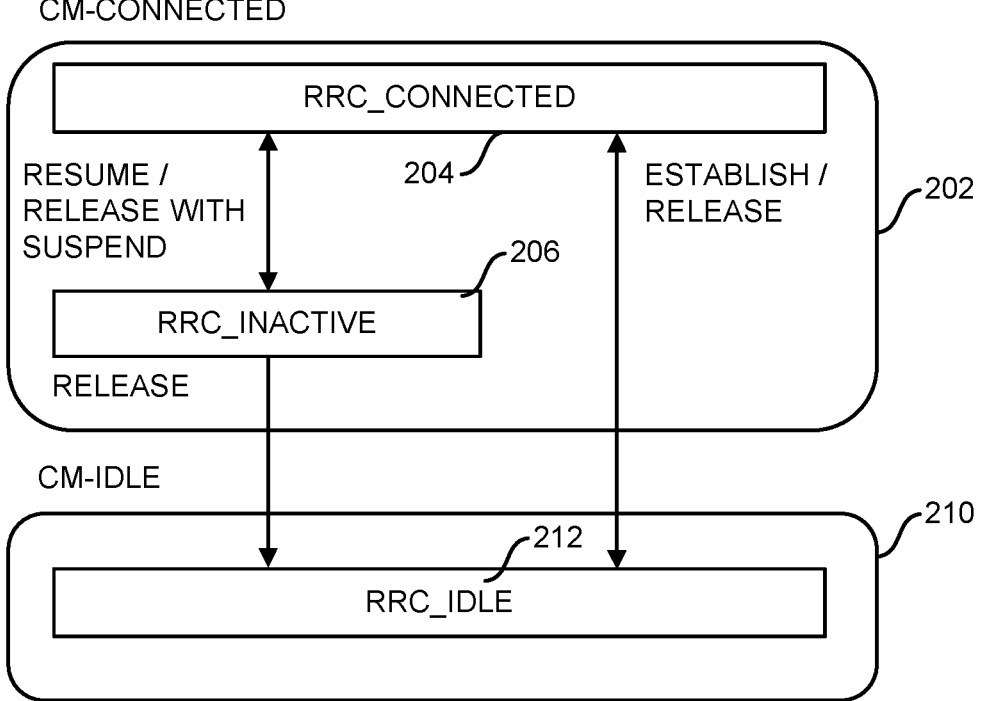
FIG. 2 depicts connection management states, in accordance with some example embodiments.

FIG. 2 depicts connection management in the cellular system including 5G. In the cellular system, there may be two connection management (CM) states, such as connected (labelled CM-CONNECTED) 202 and idle (labeled CM-IDLE) 210. The radio resource control (RRC) states RRC-_CONNECTED 204 and RRC_INACTIVE 206 are considered to be part of (or included in or associated with) the CM-CONNECTED state 202. And, the RRC_IDLE 212 is considered to be part of (or included in or associated with) the CM-IDLE state 210. For example, when the user equipment (UE) 105 is in RRC_CONNECTED state, the UE's 105 context (e.g., UE state information, security information, UE capability information, etc.) is kept by or within the RAN 110 and may be transmitted over a P2P interface, such as the Xn interface (see, e.g., 3GPP TS 38.300) between a source base station (e.g., source gNB) and a target base station (e.g., during mobility events).

Figure 3:
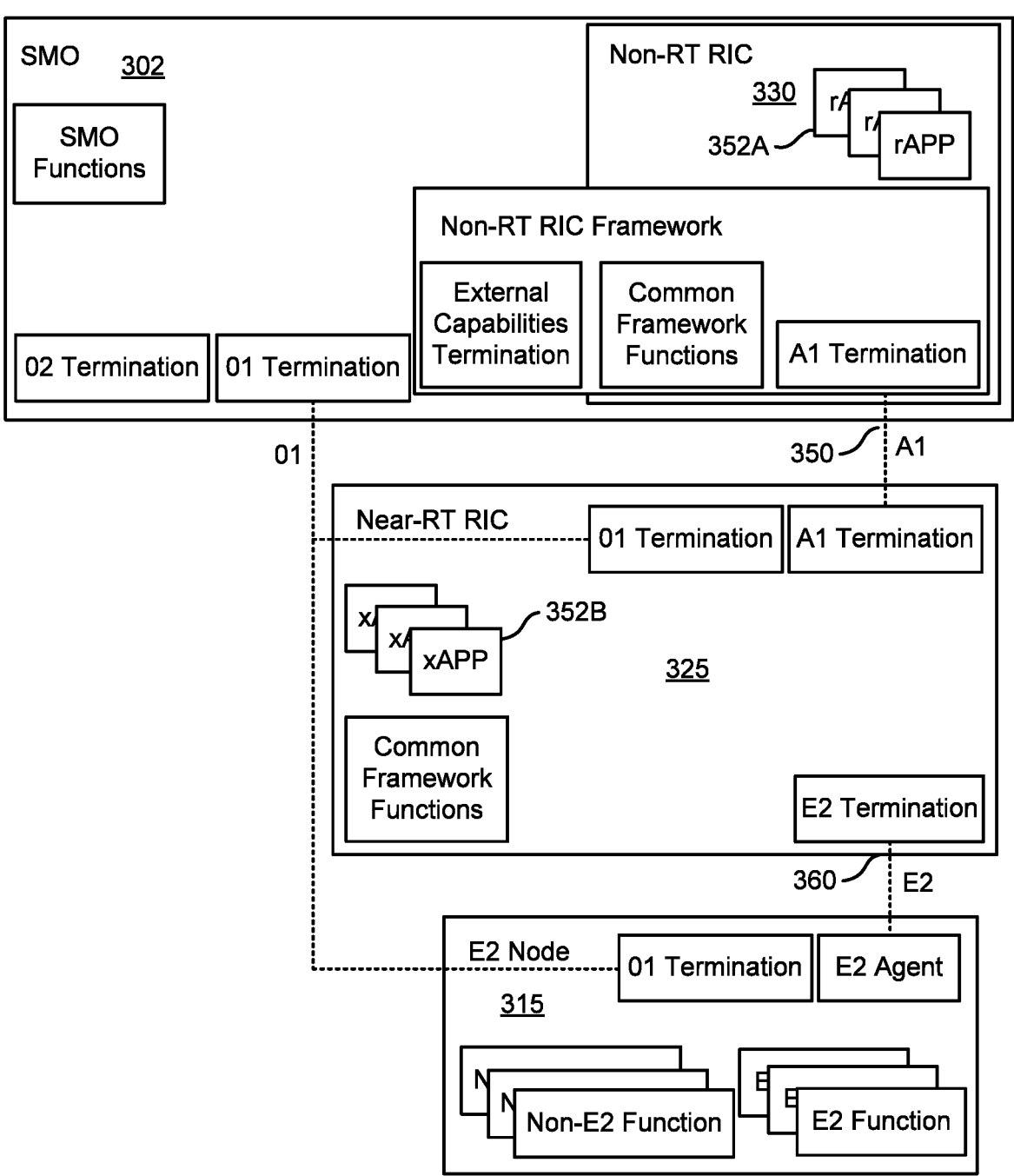
FIG. 3 depicts a block diagram of the open radio access network architecture, in accordance with some example embodiments.

In addition to 3GPP technology, the Open-Radio Access Networks (O-RAN) Alliance is developing technology to provide open radio access networks (see, e.g., O-RAN Near-Real-time RAN Intelligent Controller Architecture & E2 General Aspects and Principles 1.01—July 2020 and O-RAN Near-Real-time RAN Intelligent Controller, E2 Application Protocol 1.01—July 2020). FIG. 3 depicts an example of the O-RAN system architecture including (1) the 3GPP 5G standalone architecture with split RAN (CU/DU-split) each of which is called an E2 Node 315 and an (2) automation part that consists of a Near-Real-time (Near-RT) RAN Intelligence Controller (RIC) 325 within the RAN and a Non-RT RIC 330 within Service Management and Orchestration (SMO). The Non-RT RIC 330 may reside in service management & orchestration (SMO) 302. The Non-RT RIC 330 may perform non-real-time operations, and may (through the A1 interface 350) communicate with Near-RT RIC over a defined A1 interface 325. Moreover, the Non-RT RIC 330 may modify internal applications 352A-B at the Non-RT RIC or Near-RT RIC. Moreover, the Non-RT RIC 330 may monitor, analyze, and feedback on the Near-RT RIC state; provide enrichment information; and facilitate, train, and distribute machine learning (ML) models for previous tasks. The Near-RT RIC 352 may, through the E2 interface 360, communicate with one or more E2 Nodes, such as E2 node 315 (open control unit (O-CU) control plane (O-CU-CP), O-CU user plane (O-CU-UP), open distributed unit (O-DU), and open evolved NodeB (O-eNB)) for time sensitive management and control of the radio resources, such as interference management, handover management, Quality of Service (QoS) management, and radio connection management. Both Non-RT RIC and Near-RT RIC employ SBA principles and utilize SBI for communicating internally and with each other. However, as shown in FIG. 3, the ORAN also employs P2P interfaces, such as the E2 interface towards E2 Nodes, rather than a service-based architecture including service-based interfaces (SBI).

The RAN UE context (e.g., in 3GPP) and the UE context relevant information (e.g., in ORAN) may be stored in a central entity, such as a serving base station (e.g., a gNB- CU-CP) or a Near-RT RIC. In case of mobility for an RRC connected UE 105 for example, the RAN UE context needs to be exchanged over P2P interfaces, such as the Xn, in a distributed way to support the UE's mobility. In case of conditional handover (CHO) for example, multiple target cells may be prepared, so the UE context is sent to each target cell. In case of CHO, the delay constraints may be more relaxed compared to a baseline handover (HO) or a dual access protocol stack (DAPS) HO, as the HO preparation and HO execution are decoupled in terms of execution times. If, however, there are UE context updates during that gap, it incurs additional Xn signaling to update the UE context. Moreover, the history of previous events, such as the UE's trajectory information and the like, may not be tracked efficiently in such distributed approach. This may be an issue since the intelligence and analytics on the UE may not be maintained efficiently. That is, in order to maintain the intelligence/analytics on the UE, the information may need to be sent over multiple P2P interfaces, such as Xn interfaces (e.g., for a first serving cell, for a target cell, for a next target cell, and so forth). However, the presence of a UE context with additional intelligence information in each Xn signaling message may be further optimized. This may not only reduce the load on Xn, but also can ensure that the information fetch by an AN element (e.g., a gNB base station) may be optimized as well. If the UE context is stored in a shared space where two or more AN elements can have access, the procedures can involve, for example, updating the UE context by the source gNB before the Xn message is sent to the target gNB.

In some example embodiments, there is provided handling of a UE context information for a UE in a connected state. Moreover, in some example embodiments, the UE context information may be handled in systems operating under a service-based (R)AN architecture (SB-(R)AN) and/or O-RAN. An SB-RAN architecture can comprise AN elements, such as RAN NFs belonging to a 3GPP and O-RAN. Such SB-RAN architecture may be referred to as a unified SB-(R)AN architecture.

In some example embodiments, there is provided a data storage function (DSF) having a service-based interface (SBI). In some example embodiments, the DSF is a (R)AN element (function, logical entity, or node), in which case it is referred to as a (R)AN-DSF. The (R)AN DSF may be used to retrieve (e.g., fetch), store, and update a UE's context information. These operations may be performed by any authorized network function (NF), such as a source gNB base station, a target gNB base station, Near-RT RIC, and/or other network functions or entities in the (R)AN and/or core and/or management system (e.g., OAM). The DSF may be accessed by an authorized entity to store a UE's context information. Moreover, the UE context information at the DSF may be accessed for updating in case of an event occurrence requiring an update on one or more UE context information or for retrieving in case of an event occurrence requiring the retrieval of one or more UE context information. The DSF may provide UE context storage, update, fetch and any other operation that may provide efficient handling of UE context information in the network.

Although some of the examples described herein depict and describe the RAN-DSF as a single NF, the RAN-DSF may be implemented as part of a data storage architecture (e.g., a RAN data storage architecture) that may include one or more elements (e.g., functions, logical entities, or nodes). For example, a RAN data storage architecture may include a RAN-DSF, a data repository, and/or a data management entity. Moreover, different deployment options may be implemented, where the elements may be collocated. Furthermore, the elements of the data storage architecture may perform storage and retrieval of data, such as UE context information.

Within SB-RAN architecture, the shown entities herein can be in any form that consequently realizes service-based architecture principles. Similarly, the communication among these entities can be performed over interfaces via any communication technology that enables service-based communication. For example, the shown entities can be in the form of (but not limited to) NFs or microservices and the shown procedures can be performed via SBI. Furthermore, for example HTTP(S) can be used for the communications between the network elements/network functions/microservices. Accordingly, the shown information elements can be communicated via HTTP Request and Response messages, e.g., HTTP POST, HTTP GET, HTTP PUT, HTTP PATCH Request messages and the associated HTTP Response messages.

Microservices could be understood as more modular services (as compared with services produced/provided by NFs) that come together to provide a meaningful service/application. In this scope, one can deploy and scale the small modules flexibly (e.g. within a NF or between various NFs). For example, an NF can provide one or more services, and a microservice can represent small modules that make up the services in the NF. Moreover, microservices can communicate with each other, e.g., statelessly.

In some example embodiments, the UE context information may be saved in the (R)AN DSF with an associated identifier, such as a UE ID to be identifiable by any authorized network node, entity in the (R)AN, and/or core and/or management system (e.g., OAM). And, this identifier may be allocated by any authorized network node in the network in the form of, for example, a gNB-CU UE F1AP ID, a gNB-CU-CP UE E1AP ID, an AMF UE NGAP ID, or any other type of identifier allocated by, for example a base station such as a distributed gNB-CU-CP. For example, gNB-CU UE F1AP ID is used to uniquely identify a UE over the F1 interface within gNB-CU; gNB-CU-CP UE E1AP ID is used to uniquely identify a UE over the E1 interface within gNB-CU; and AMF UE NG AP ID is used to uniquely identify a UE over the NG interface within the AMF. A UE persistent identifier may be used (which remains same across one or more state transitions such as IMEISV, P-TMSI, GUTI, etc.) as a key to index the UE context information stored in the data storage architecture, such as the RAN-DSF. Some further examples of the UE identifiers can be UE 5G-GUTI (Global Unique Temporary Identifier), where 5G-GUTI contains a variety of information e.g., information regarding the cell and also the responsible AMF, and also it is one of the most secure UE identification that can be used between UE, gNB, and AMF; S-TMSI; or a new identifier.

In some example embodiments, the UE context information may be saved in the (R)AN DSF with an associated gNB ID and/or E2 Node ID. For example, a global gNB ID, such as the gNB ID and/or E2 Node ID, may be used to uniquely identify gNBs within a public land mobile network (PLMN). In some example embodiments, the UE context information may be saved in the (R)AN DSF with an associated NF ID or logical entity ID.

In some example embodiments, the authorized and registered (R)AN elements (e.g., access nodes, and/or Near-RT RIC(s)) may subscribe, via the SBI, to the (R)AN DSF's UE context service with the associated gNB ID and/or E2 Node ID. The context service at the DSF can be responsible for handling registration, subscription, retrieval, and/or publication of UE context information.

In case of mobility events towards an E2 Node (e.g., a target gNB) for example, the target Near-RT RIC (which is serving the target gNB) may get publication information via a defined service operation for the UE context service from the (R)AN DSF, in accordance with some example embodiments, In case of updates to a UE context information for example, an authorized (R)AN node may also receive or fetch updates, in accordance with some example embodiments, for example, when CHO is prepared with an authorized target gNB and the source gNB updates UE context information, the target gNB(s) may receive or fetch such updates, via the SBI, from the (R)AN DSF (after the source gNB updates UE context information in the RAN DSF).

In some example embodiments, during mobility events in the handover preparation request, the Xn signaling may be optimized by including only the minimal information, such as the UE ID for accessing the respective UE context information of the UE. The Xn signaling may include other information from the source node to the target node that may be necessary for the handover preparation operations.

When the HO preparation request is received by a target node, the target node can retrieve the UE context information and other intelligence information from the (R)AN DSF in the background, without affecting the HO latency. In some embodiments, UE context information is enriched with history information such that it can be used by, for example, artificial intelligence and/or machine learning to identify, for example, UE trajectory (e.g., UE historical intelligence). Such enrichment may be performed in, for example, Near-RT RIC. Moreover, the UE context information stored in the (R)AN DSF may be categorized per UE or categorized per UE group. In other words, the UE context information may map to a single UE or may map to a group of UEs. An example for a group of UEs can be in the scenario of vehicle-to-anything (V2X) communications, such as a V2X platooning use case.

Figure 4:
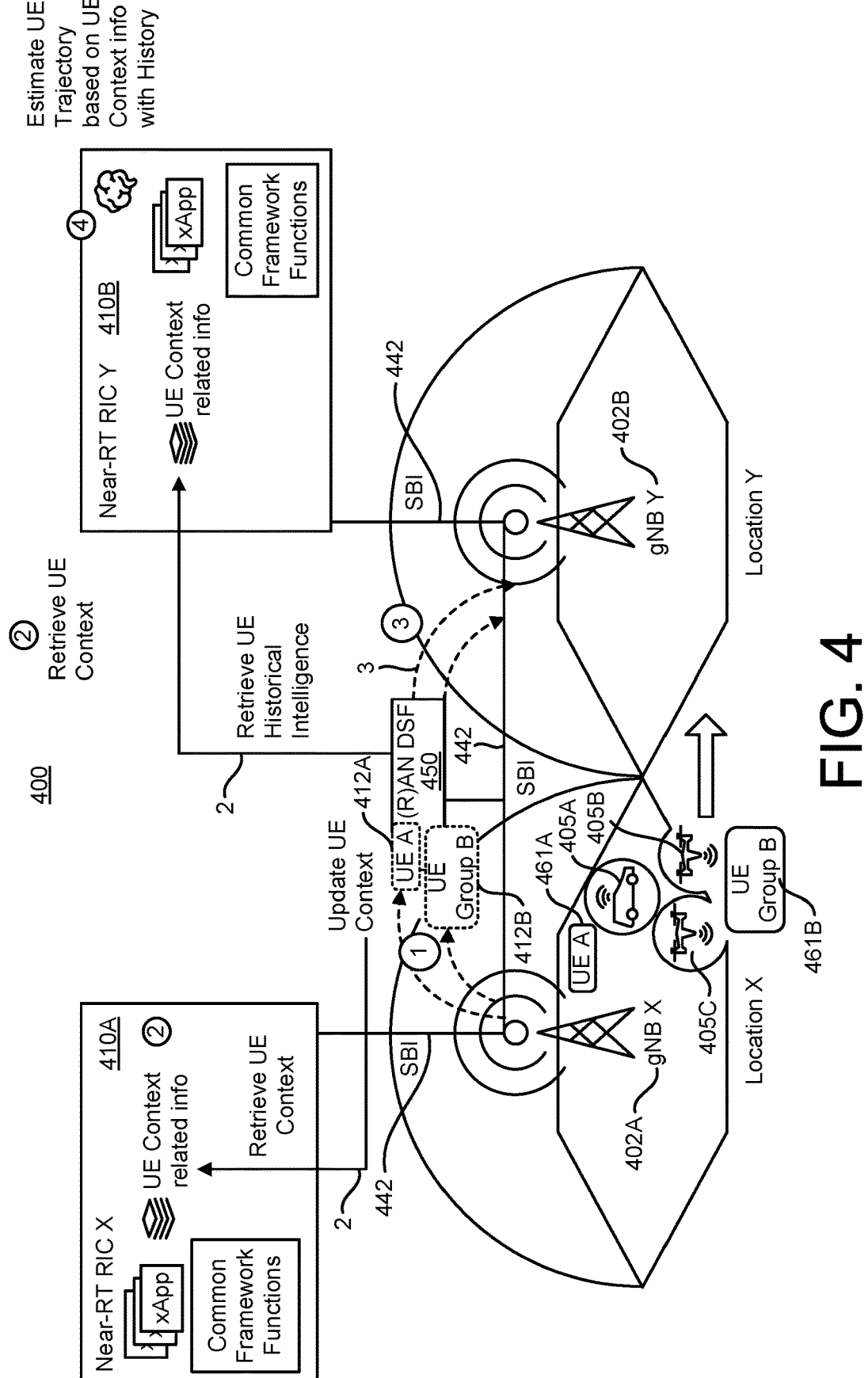
FIG. 4 depicts an example of a system in which a radio access network data storage function (DSF) is used to store, retrieve, and update user equipment context information, in accordance with some example embodiments.

FIG. 4 depicts an example of a system 400 including the (R)AN DSF 450, in accordance with some example embodiments. The system 400 further includes a first base station 402A, a first Near-RT RIC 410A, a second base station 402B, a second Near-RT RIC 410B, a first UE 405A, and a second UE 405B. In the example of FIG. 4, the first and second base stations are depicted as gNB base stations, although other types of base stations may be used as well. Moreover, the first base station is a source base station and the second base station is a target base station for a handover event. The access nodes depicted in FIG. 4 may be of the form of a disaggregated gNB (e.g., having CU-DU split) or a collection of NFs (e.g., deployed in a cloud service environment).

In some example embodiments, the (R)AN data storage function (DSF) 450 may be a service-based architecture function having a service-based interface (SBI). In the example of FIG. 4, the SBI messaging bus is shown at 442). The (R)AN DSF may store context information for one or more of the UEs, such as UE 405A, UE 405B, and UE 405C which are in an RRC connected state. As noted above, the UE context information may be for a single UE, such as the UE context information 412A for UE 405A, or for a group of UEs, such as the group of UEs 405B-C and the corresponding UE context information 412B. Accordingly, the UE context information can comprise information related to the UE group. Other authorized functions of nodes in the (R)AN may access (e.g., fetch, retrieve, update, etc.) the UE context information stored at the (R)AN DSF 450. For example, at the completion of a process, such as a handover in the event of mobility, the UE context information (which is stored at RAN DSF 450) may be updated. In some example embodiments, an authorized network function (NF), (R)AN element, or node may access the UE context information for a given UE, such as UE 405A. In some embodiments, the (R)AN DSF includes or has access to a database (may together be referred to as DSF architecture or (RAN) data storage architecture) which stores the UE context information. The database may store the UE context information based on the identifier.

In the example of FIG. 4, the UEs 405A-C each has context information stored at the (R)AN DSF 450. The first base station 402A is a source base station and the second base station 402B is a candidate target base station for a handover event. The first base station 402A may access, via the SBI 442, the (R)AN DSF 450. Likewise, the Near-RT RIC 410A, the second base station 402B, and the Near-RT RIC 410B may each access, via the SBI 442, the (R)AN DSF 450. The first base station 402A, the Near-RT RIC 410A, the second base station 402, and the Near-RT RIC 410B may be authorized to access the (R)AN DSF 405. The authorization may be performed by the (R)AN DSF or another NF, e.g., network repository function, which can be located in, for example, the (R)AN. For the authorization, the NF profiles and the associated authorized services may be pre-configured. The authorization can be based on, e.g., operator configurations and/or network management configurations, such as OAM. The first base station 402A, the Near-RT RIC 410A, the second base station 402B, and the Near-RT RIC 410B may also subscribe to services regarding the UE context information for a given UE and/or UE group.

At 1, the first base station 402A may update the context information 461A for UE 405A by providing an updated UE context information 412A to the (R)AN DSF 450 through initiating an update service operation via SBI. (R)AN DSF, upon receiving the corresponding service operation, updates the respective UE context information according to the provided UE context information. The first base station 402A may also update the context information 461B for the group of UEs 405B by providing an updated UE context information 412B to the (R)AN DSF 450. The updated UE context information 412A may be stored such that it can be retrieved based on an identifier (e.g., a key, UE identifier, a gNB identifier, and/or the like). Similarly, the updated UE context information 412B may also be stored such that it can be retrieved based on an identifier (e.g., a key, UE identifier, a gNB identifier, and/or the like). As noted, the first base station 402A may be authorized to access and/or update the UE context information 412 at the (R)AN DSF.

At 2, an O-RAN network entity, such as the Near-RT RIC 410A, may retrieve, from (R)AN DSF 450, the updated context information, such as UE context information 412A for UE 405A and UE context information 412B for UEs 405-C. And, the Near-RT RIC 410B, may retrieve, from (R)AN DSF 450, the updated context information, such as UE context information 412A and the UE context information 412B. In the example of FIG. 4, the Near-RT RIC 410B may seek to estimate the trajectory of the UEs 405A-C. In some example embodiments, the Near-RT RIC 410A and Near-RT RIC 410B subscribe to the UE context information 412A and 412B, such that the (R)AN DSF publishes the update to the Near-RT RIC 410A and Near-RT RIC 410B whenever an update to the corresponding UE context information occurs. As noted, the Near-RT RIC 410A and the Near-RT RIC 410B may be authorized to access and/or retrieve the UE context information 412A and UE context information 412B and/or subscribe to receive the updates on the UE context information 412A and UE context information 412B at the (R)AN DSF.

At 3, the second base station 402B may retrieve, from (R)AN DSF 450, the updated context information, such as UE context information 412A for UE 405A and UE context information 412B for UEs 405B-C. As noted, the second base station 402B may be a target base station preparing for a handover by obtaining, via the SBI 442, the updated context information from the (R)AN DSF. Moreover, as noted, the second base station 402B may be a target base station for a handover event of one or more UEs or UE groups, in which case the Xn signaling may be optimized in terms of latency and payload by only including the minimal information, such as the UE ID and retrieving, via the SBI 442, the respective UE context information from (R)AN-DSF prior to handover preparation.

In the example of FIG. 4, non-delay critical UE context information (e.g., the UE historical intelligence) may be retrieved by an authorized network node (or, e.g., network functions or logical entities), such as the second base station 402B and the Near-RT RIC 410B in the background, without impacting the latency of a UE-associated procedure like a handover from the first source base station 402A to the second target base station 402B. The UE historical intelligence may be used (e.g., by Near-RT RIC 410B) to estimate the UE trajectory and/or for any other AI/ML algorithms in the Near-RT RIC. Such algorithms may also be implemented in the access nodes, such as gNBs.

Figure 5:
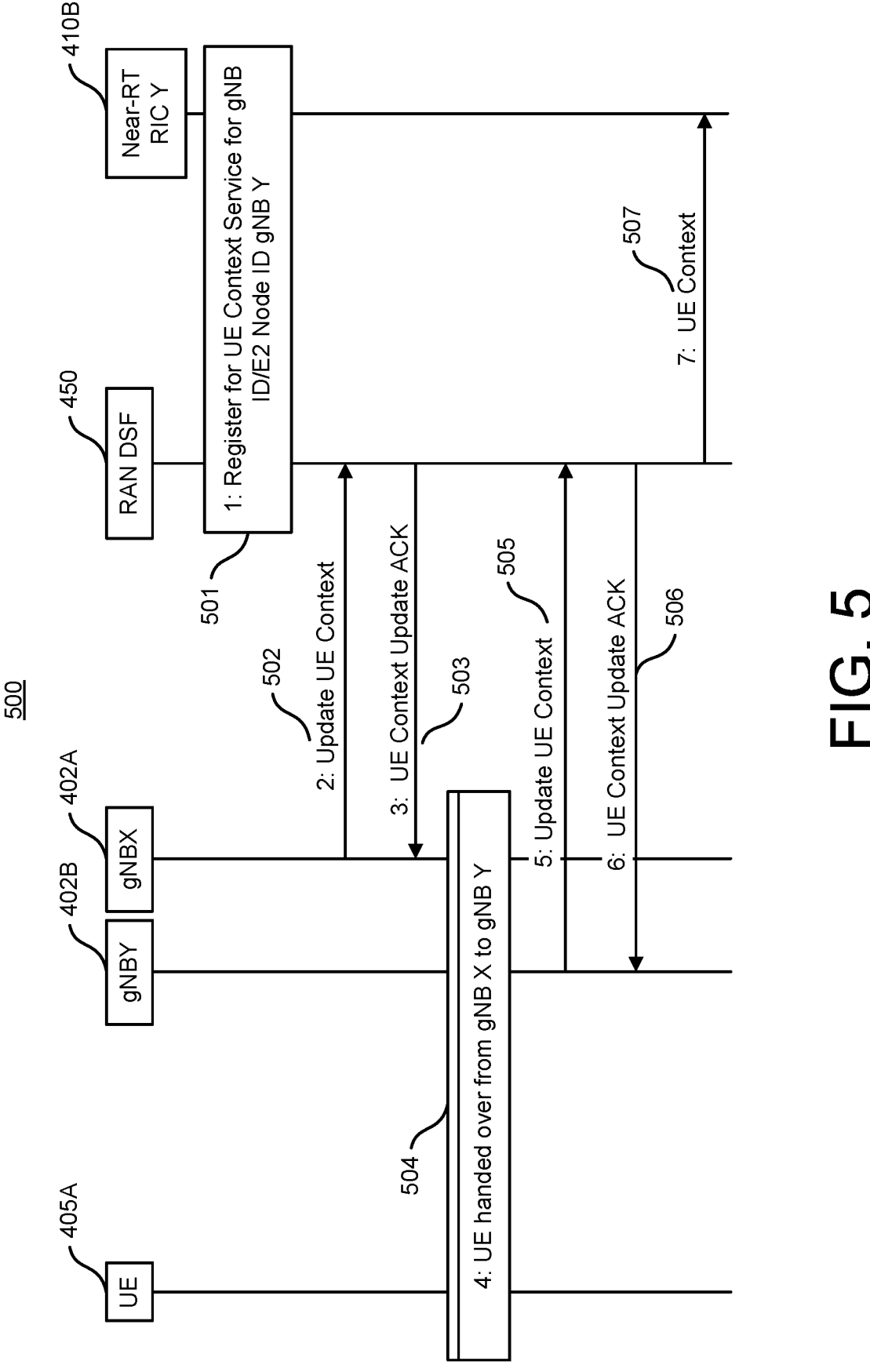
FIG. 5 depicts an example of a process for accessing the user equipment context information from the radio access network data storage function (DSF), in accordance with some example embodiments.

FIG. 5 depicts an example of a process 500 for retrieving UE context information, in accordance with some example embodiments. In the example of FIG. 5, the UE context information may be stored at the (R)AN DSF 450 with a key, such as an identifier e.g., a UE ID, a gNB ID, an E2 Node ID, and/or a combination thereof) that uniquely identifies the stored context information. In the example of FIG. 5, the Near-RT RIC 410B may subscribe to the UE context service provided by the (R)AN DSF 450 for the one or more UEs in the associated E2 nodes.

At 501, the Near-RT RIC 410B may subscribe for retrieving the UE context information stored at the (R)AN DSF 450. This subscription service operation may include providing a key, such as an identifier to clearly specify the subscription details, to the (R)AN DSF 450 over the SBI 142. In some example embodiments, the identifier may indicate a UE identifier. Alternatively, or additionally, the identifier may include E2 Node ID. Alternatively, or additionally, the identifier may include the gNB ID. When an authorized function or node is subscribed to a UE's context information, the function or node may then access the UE context information and/or receive updates to the context (e.g., which may be published via the SBI to the function or node) whenever the specified subscription details are fulfilled.

At 502, the source gNB base station 402A may update the UE context information stored at the (R)AN DSF 450 over the SBI 142. For example, the UE context information for UE 405A may be updated by sending, via the SBI interface, a message to the (R)AN DSF 450, so the (R)AN DSF can store the updated UE context information for a given UE, such as UE 405A and/or UEs 405B-C. This message may include a key, such as an identifier, to the stored UE context information being updated. For example, the identifier may be one or more of the following: a UE ID, a gNB ID, an E2 Node ID.

At 503, the (R)AN DSF 450 may send to the source gNB base station 402A an acknowledgement regarding the successful update of 502. For example, the (R)AN DSF may send via the SBI interface 142 the acknowledgement as a message to the source base station 402A. As noted, processing of the service operation regarding the update of the given UE context information at the (R)AN DSF may be unsuccessful, in which case the (R)AN DSF may send, for example via SBI interface 142, to the source gNB base station 402A a response with an appropriate description for the cause of failure.

At 504, the UE 405A may be handed over from the source gNB base station 402A to the target gNB base station 402B. This may cause or trigger a need for the updates in the context information for the UE 405A. As noted, the UE context information may include UE capability information, UE identity information, a UE mobility state, user security parameters, UE historical information regarding mobility state, and the like.

At 505, the target gNB base station 402B may update the UE context information for UE 405A in response to the successful handover of the UE 405A to the target base station. For example, the target gNB base station may send, via the SBI interface 142, the updated context to the (R)AN DSF 450, so that the (R)AN DSF can store the updated context for the UE 405A. As noted, the stored context may be stored based on a key, such as a database key including at least one or a portion of the UE identifier, the currently serving base station identifier, and/or the like.

At 506, the (R)AN DSF 450 may send to the target gNB base station 402B an acknowledgement regarding the update of 505. For example, the (R)AN DSF may send via the SBI interface 142 the acknowledgement as a message to the target base station. As noted, processing of the service operation regarding the update of the given UE context information at the (R)AN DSF may be unsuccessful, in which case the (R)AN DSF may send, for example via SBI interface 142, to the target gNB base station 402B a response with an appropriate description for the cause of failure.

At 507, the (R)AN DSF 450 may publish (e.g., send messages via the SBI interface) the updated UE context information to other network functions, such as Near-RT RIC 410B as well as other network functions that may be subscribed to receiving the UE context information and/or UE context information updates, and/or the like for UE 405A. For example, a function or node, such as Near-RT RIC 410B may subscribe to UE context-related services at (R)AN DSF and may use the received UE context information with historical information to estimate UE trajectory. Accordingly, based on the authorization and the provided service, part of the UE context information and/or processed UE context information (e.g., processed by AI/ML algorithms) may be sent to the target function(s) or node(s).

At 504 the Xn signaling between base stations may be optimized in latency and payload perspectives by fetching the UE context information from the (R)AN DSF before handover preparation and by including only the UE ID and/or a minimal information set during the handover preparation request. By including only the UE ID and/or a minimal information set during the handover preparation request in the Xn signaling, 504 above becomes novel as well.

Figure 6A:
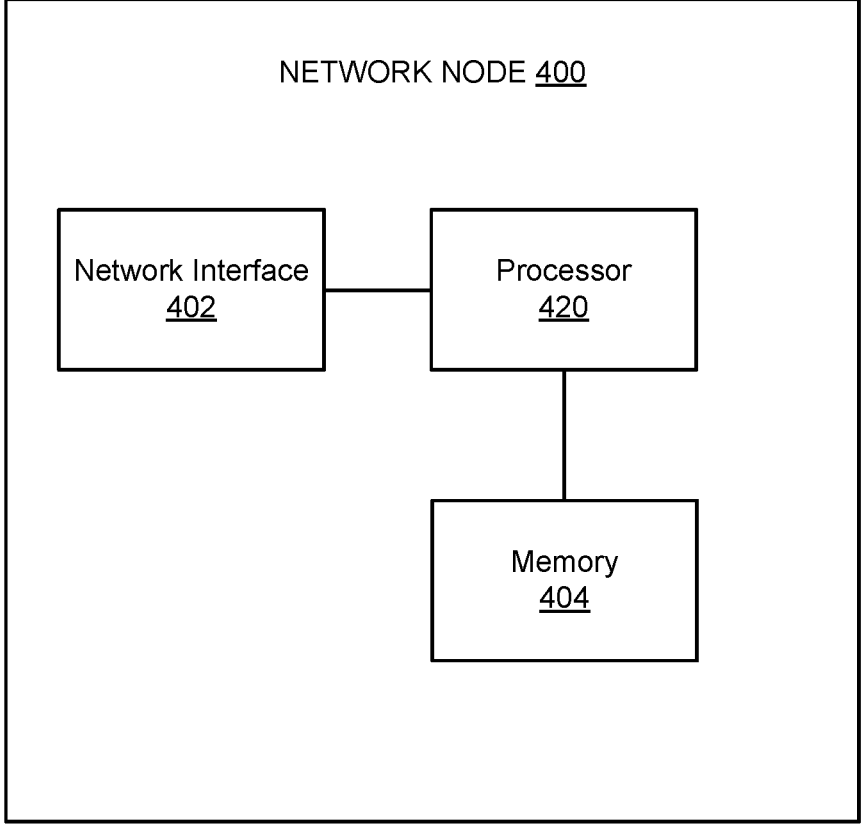
FIG. 6A depicts an example of a network node, in accordance with some example embodiments.

FIG. 6A depicts a block diagram of a network node 400, in accordance with some example embodiments. The network node 400 may comprise or be comprised in one or more network side nodes or functions, such as a base station (e.g., gNB, eNB, (R)AN DSF, Near RT RIC, and/or the like).

The network node 400 may include a network interface 402, a processor 420, and a memory 404, in accordance with some example embodiments. The network interface 402 may include wired and/or wireless transceivers to enable access to other nodes including base stations, other network nodes, the Internet, other networks, and/or other nodes. The memory 404 may comprise volatile and/or non-volatile memory including program code, which when executed by at least one processor 420 provides, among other things, the processes disclosed herein with respect to the network nodes.

In some example embodiments, the network node 400 may provide a data storage function, such as a radio access network data storage function. When this is the case, there may be provided: receiving at a radio access network data storage function in a network, from a first network node in the network via a service-based interface, an update request comprising at least one context information for at least one user equipment in the network and a context key, wherein the at least one user equipment is in a radio resource control connected state; storing or updating the at least one context information for the at least one user equipment at the radio access network data storage function; receiving a retrieve request from a second network node in the network via the service-based interface, wherein the retrieve request comprises the context key; retrieving the at least one context information for the at least one user equipment in response to the retrieve request from the second network node based at least on the context key; and sending the at least one context information for the at least one user equipment to the second network node via a service-based interface. Moreover, the first network node is the same as the second network node. The first network node and/or the second network node comprises or is comprised in a base station in the network, a centralized unit of the base station, a distributed unit of the base station, a near-real-time radio access network intelligence controller in the network, and/or a network function in the network. The update request comprises an indication indicating a radio resource control state of the at least one user equipment. The method may further include prioritizing the retrieval of the at least one context information for the at least one user equipment based at least on the radio resource control state of the at least one user equipment. The context key is associated with the at least one context information for the at least one user equipment in the radio resource control connected state to enable storage and/or retrieval of the at least one context information at the radio access network data storage function. The context key comprises at least an access point identifier allocated by a third network node in the network, wherein the third network node comprises or is comprised in a base station in the network, a centralized unit of the base station, a distributed unit of the base station, a near-real-time radio access network intelligence controller in the network, a access and mobility management function in the network or a network function in the network. The context key is allocated by the third network node when the at least one user equipment performs an initial access to the network to move into the radio resource control connected state. The third network node comprises the first network node or the second network node. The method may further include receiving a register request and/or a subscribe request from a fourth network node in the network. The method may further include notifying, by the radio access network data storage function, the fourth network node of an update of the at least one context information for the at least one user equipment, wherein the fourth network node is registered and/or subscribed to the radio access network data storage function.

In some example embodiments, the network node 400 may provide a first network node. When this is the case, there may be provided: sending, by a first network node in a network via a service-based interface, to a radio access network data storage function in the network, an update request comprising at least one context information for at least one user equipment in the network and a context key, wherein the at least one user equipment is in a radio resource control connected state; sending, by the first network node via the service-based interface, a retrieve request to the radio access network data storage function to retrieve the at least one context information for the at least one user equipment, wherein the retrieve request message comprises the context key; and receiving, by the first network node, the at least one context information for the at least one user equipment from the radio access network data storage function via the service-based interface. Moreover, the update request comprises an indication indicating a radio resource control state of the at least one user equipment. The method may further include sending a handover request to a second network node in the network, wherein the handover request comprises an user equipment identifier of the at least one user equipment, and wherein the handover request comprises no context information for the at least one user equipment. The method may further include sending the retrieve request to the radio access network data storage function in response to a handover request, wherein the handover request comprises an user equipment identifier of the at least one user equipment, and wherein the handover request comprises no context information for the at least one user equipment. The method may further include sending the retrieve request to the radio access network data storage function in response to a handover request, wherein the handover request comprises an user equipment identifier of the at least one user equipment and the at least one context information for the at least one user equipment. The context key comprises the user equipment identifier of the at least one user equipment. The method may further include sending a register request and/or a subscribe request to the radio access network data storage function, wherein the register request and/or the subscribe request comprises an identifier of the first network node. The method may further include receiving an update of the at least one context information for the at least one user equipment from the radio access network data storage function after being registered and/or subscribed to the radio access network data storage function. The context key is associated with the at least one context information for the at least one user equipment in the radio resource control connected state to enable storage and/or retrieval of the at least one context information at the radio access network data storage function. The context key comprises at least an access point identifier allocated by a third network node in the network, wherein the third network node comprises or is comprised in a base station in the network, a centralized unit of the base station, a distributed unit of the base station, a near-real-time radio access network intelligence controller in the network, a access and mobility management function in the network or a network function in the network. The context key is allocated by the third network node when the at least one user equipment performs an initial access to the network to move into the radio resource control connected state. The third network node comprises the first network node or the second network node.

Figure 6B:
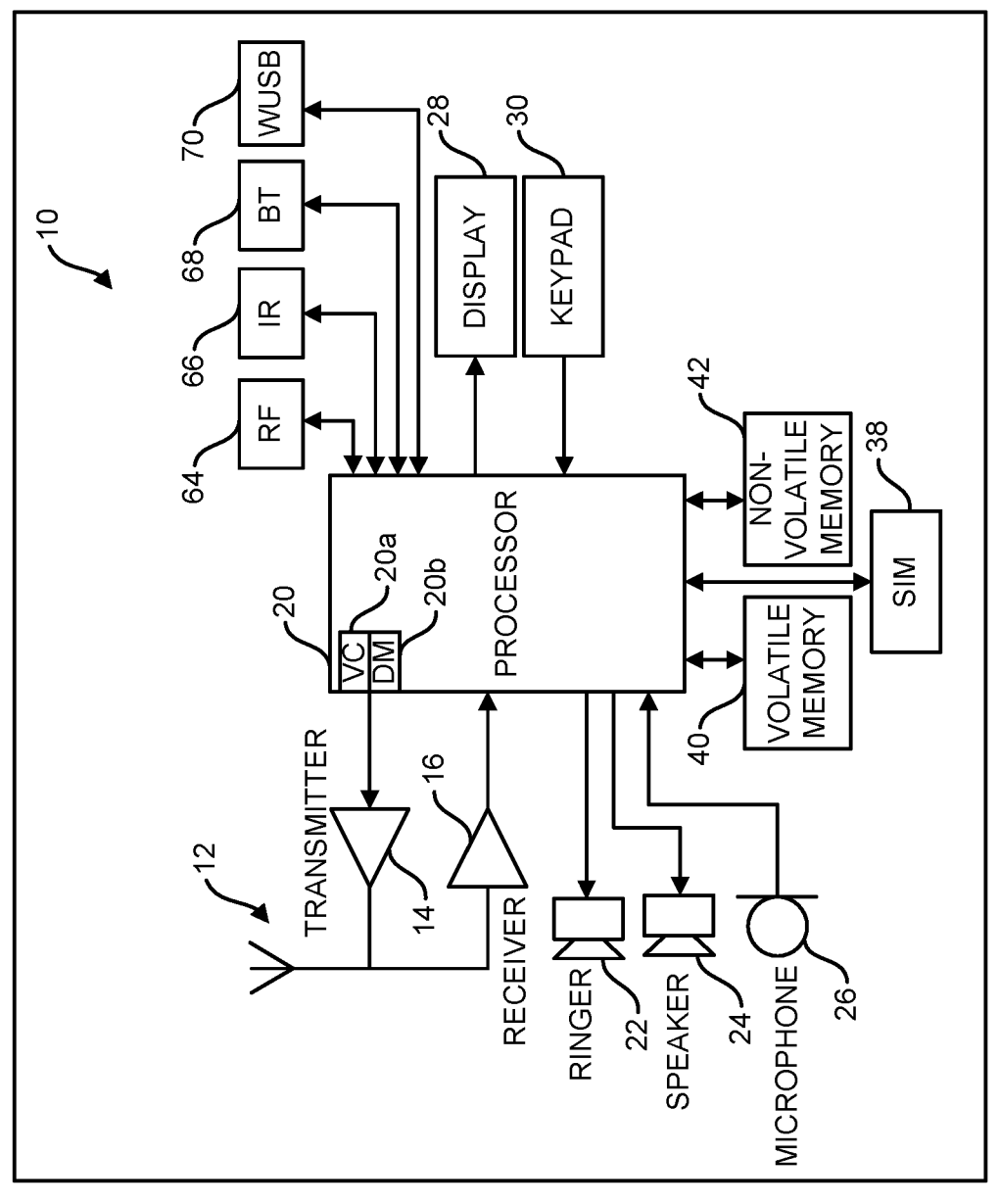
FIG. 6B depicts an example of an apparatus, in accordance with some example embodiments.

FIG. 6B illustrates a block diagram of an apparatus 10, in accordance with some example embodiments. The apparatus 10 may comprise or be comprised in a user equipment, such as user equipment 304. The user equipment may comprise or be comprised in an IoT device, an Industrial IoT device, and/or the like. In the case of an IoT device or IToT device, the UE may be configured to operate with less resources (in terms of for example power, processing speed, memory, and the like) when compared to a smartphone, for example.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6B as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6B, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, U-SIM, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE (e.g., one or more of the processes, calculations, and the like disclosed herein including the processes at FIGS. 3A-3B). For example, the apparatus may be configured to receive information including one or more parameters to configure reporting of channel state information for a first reporting type and a second reporting type; determine whether to apply the first reporting type or the second reporting type, wherein the determining is based at least on an indication provided by a network node, the information received to configure the reporting of the channel state information, and/or a predefined rule that defines when to apply the first reporting type or the second reporting type; interpret, based on the determined first reporting type or the determined second reporting type, the information including the one or more parameters to configure reporting of channel state information; and report based on the determined the first reporting type or the second reporting type.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiments, the application logic, software or an instruction set is maintained on any one of various conventional computer-readable media. In the context of this document, a "computer-readable storage medium" may be any non-transitory media that can contain, store, communicate, propagate or transport the instructions for use by or in connection with an instruction execution system, apparatus, or device, such as a computer or data processor circuitry; computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may include: a cloud-native service-based RAN architecture; tracking of the UE context information in SB-RAN architecture; updated of the UE context information in case of the RAN events such as HO, CHO, and the like; efficient UE historical intelligence storage, update, or retrieval in SB-RAN and O-RAN environments; and/or optimized signaling and latency for many UE-associated procedures.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
    receiving at a radio access network data storage function in a network, from a first network node in the network via a service-based interface, an update request comprising at least one context information for at least one user equipment in the network and a context key, wherein the at least one user equipment is in a radio resource control connected state;
    storing or updating the at least one context information for the at least one user equipment at the radio access network data storage function;
    receiving a retrieve request from a second network node in the network via the service-based interface, wherein the retrieve request comprises the context key;
    retrieving the at least one context information for the at least one user equipment in response to the retrieve request from the second network node based at least on the context key; and
    sending the at least one context information for the at least one user equipment to the second network node via a service-based interface.

2. The method of claim 1, wherein the first network node is the same as the second network node.

3. The method of claim 1, wherein the first network node and/or the second network node comprises or is comprised in a base station in the network, a centralized unit of the base station, a distributed unit of the base station, a near-real-time radio access network intelligence controller in the network, and/or a network function in the network.

4. The method of claim 1, wherein the update request comprises an indication indicating a radio resource control state of the at least one user equipment.

5. The method of claim 4, further comprising:
    prioritizing the retrieval of the at least one context information for the at least one user equipment based at least on the radio resource control state of the at least one user equipment.

6. The method of claim 5, wherein the context key is associated with the at least one context information for the at least one user equipment in the radio resource control connected state to enable storage and/or retrieval of the at least one context information at the radio access network data storage function.

7. The method of claim 1, wherein the context key comprises at least an access point identifier allocated by a third network node in the network, wherein the third network node comprises or is comprised in a base station in the network, a centralized unit of the base station, a distributed unit of the base station, a near-real-time radio access network intelligence controller in the network, a access and mobility management function in the network or a network function in the network.

8. An apparatus in a network comprising:
   at least one processor, and at least one memory including computer program code, the at least one memory and the computer program code configured to, with the at least one processor, cause the apparatus to at least:
   receive, from a first network node in the network via a service-based interface, an update request comprising at least one context information for at least one user equipment in the network and a context key, wherein the at least one user equipment is in a radio resource control connected state;
   store or update the at least one context information for the at least one user equipment in the apparatus;
   receive a retrieve request from a second network node in the network via the service-based interface, wherein the retrieve request comprises the context key;
   retrieve the at least one context information for the at least one user equipment in response to the retrieve request from the second network node based at least on the context key; and
   send the at least one context information for the at least one user equipment to the second network node via a service-based interface.

9. The apparatus of claim 8, wherein the first network node is the same as the second network node.

10. The apparatus of claim 8, wherein the first network node and/or the second network node comprises or is comprised in a base station in the network, a centralized unit of the base station, a distributed unit of the base station, a near-real-time radio access network intelligence controller in the network, and/or a network function in the network.

11. The apparatus of claim 10, wherein the update request comprises an indication indicating a radio resource control state of the at least one user equipment.

12. The apparatus of claim 11, wherein the at least one memory and the computer program code are configured to, with the at least one processor, further cause the apparatus to:
   prioritize the retrieval of the at least one context information for the at least one user equipment based at least on the radio resource control state of the at least one user equipment.

13. The apparatus of claim 8, wherein the context key is associated with the at least one context information for the at least one user equipment in the radio resource control connected state to enable storage and/or retrieval of the at least one context information in the apparatus.

14. The apparatus of claim 8, wherein the context key comprises at least an access point identifier allocated by a third network node in the network, wherein the third network node comprises or is comprised in a base station in the network, a centralized unit of the base station, a distributed unit of the base station, a near-real-time radio access network intelligence controller in the network, a access and mobility management function in the network or a network function in the network.

15. A non-transitory computer-readable storage medium including program code which when executed by at least one processor causes operations comprising:
   means for receiving at a radio access network data storage function in a network, from a first network node in the network via a service-based interface, an update request comprising at least one context information for at least one user equipment in the network and a context key, wherein the at least one user equipment is in a radio resource control connected state;
   means for storing or updating the at least one context information for the at least one user equipment at the radio access network data storage function;
   means for receiving a retrieve request from a second network in the network node via the service-based interface, wherein the retrieve request comprises the context key;
   means for retrieving the at least one context information for the at least one user equipment in response to the retrieve request from the second network node based at least on the context key; and
   means for sending the at least one context information for the at least one user equipment to the second network node via a service-based interface.

16. The non-transitory computer-readable storage medium of claim 15, wherein the first network node is the same as the second network node.

17. The non-transitory computer-readable storage medium of claim 15, wherein the first network node and/or the second network node comprises or is comprised in a base station in the network, a centralized unit of the base station, a distributed unit of the base station, a near-real-time radio access network intelligence controller in the network, and/or a network function in the network.

18. The non-transitory computer-readable storage medium of claim 15, wherein the update request comprises an indication indicating a radio resource control state of the at least one user equipment.

19. The non-transitory computer-readable storage medium of claim 18, further comprising:
   prioritizing the retrieval of the at least one context information for the at least one user equipment based at least on the radio resource control state of the at least one user equipment.

20. The non-transitory computer-readable storage medium of claim 19, wherein the context key is associated with the at least one context information for the at least one user equipment in the radio resource control connected state to enable storage and/or retrieval of the at least one context information at the radio access network data storage function.

* * * * *